US008776344B2

(12) United States Patent
Garland et al.

(10) Patent No.: US 8,776,344 B2
(45) Date of Patent: Jul. 15, 2014

(54) STEAM REFORMER TUBE ASSEMBLY AND METHOD OF ASSEMBLING OR RETROFITTING SAME

(75) Inventors: John R. Garland, Hatfield, PA (US); Paul van Helmond, Pottstown, PA (US)

(73) Assignee: Selas Fluid Processing Corporation, Blue Bell, PA (US)

( * ) Notice: Subject to any disclaimer, the term of this patent is extended or adjusted under 35 U.S.C. 154(b) by 183 days.

(21) Appl. No.: 13/587,192

(22) Filed: Aug. 16, 2012

(65) Prior Publication Data

US 2013/0209318 A1 Aug. 15, 2013

Related U.S. Application Data

(60) Provisional application No. 61/579,106, filed on Dec. 22, 2011.

(51) Int. Cl.
*B01J 8/06* (2006.01)
*B21D 39/03* (2006.01)

(52) U.S. Cl.
CPC .......... *B01J 8/06* (2013.01); *B01J 2208/00504* (2013.01); *B01J 8/062* (2013.01); *B01J 2208/0053* (2013.01)
USPC ............. 29/428; 422/162; 422/198; 422/310; 422/312; 138/89

(58) Field of Classification Search
CPC .................................. B01J 8/06; B21D 39/03
USPC ........ 422/162, 310, 312, 198; 29/428; 138/89
See application file for complete search history.

(56) References Cited

U.S. PATENT DOCUMENTS

| | | | | |
|---|---|---|---|---|
| 3,653,196 | A * | 4/1972 | Pike | 57/350 |
| 4,497,418 | A * | 2/1985 | Nunlist | 220/234 |
| 4,646,816 | A * | 3/1987 | Rothstein | 165/76 |
| 5,228,701 | A * | 7/1993 | Greinke et al. | 277/539 |
| 5,370,252 | A * | 12/1994 | Parsons et al. | 215/247 |
| 5,944,057 | A * | 8/1999 | Pierce | 138/89 |
| 6,759,016 | B2 | 7/2004 | Sederquist et al. | |
| 7,037,485 | B1 | 5/2006 | Drnevich et al. | |
| 7,919,057 | B2 | 4/2011 | Genkin et al. | |
| 2005/0235963 | A1* | 10/2005 | Kilgore | 123/456 |

* cited by examiner

*Primary Examiner* — Walter D Griffin
*Assistant Examiner* — Huy-Tram Nguyen
(74) *Attorney, Agent, or Firm* — Joshua L. Cohen

(57) ABSTRACT

A steam reformer tube assembly includes a reformer tube including a wall defining an interior space for receiving fluid delivered into the reformer tube, a plug at least partially positioned in an opening in the interior space such that a gap is defined between the plug and the wall of the reformer tube, and a sealing member positioned in the gap to either limit or prevent the passage of fluid toward the opening in the interior space of the reformer tube and along the gap that is defined between the exterior surface of the plug and the interior wall of the reformer tube. A method of assembling a steam reformer tube assembly is also provided.

15 Claims, 6 Drawing Sheets

21
21
112
112
20, 40
27
20
8
20
23

STEAM REFORMER TUBE ASSEMBLY AND METHOD OF ASSEMBLING OR RETROFITTING SAME

FIELD OF THE INVENTION

The present invention relates to a steam reformer tube assembly and a method of either assembling or retrofitting a steam reformer tube assembly.

BACKGROUND OF THE INVENTION

Steam reforming, sometimes referred to as steam methane reforming, typically uses an external source of hot gas to heat a plurality of reformer tubes in which a catalytic reaction takes place that converts steam and lighter hydrocarbons such as natural gas (methane) or refinery feedstock into hydrogen and carbon monoxide (syngas). Syngas reacts further to give more hydrogen and carbon dioxide in the reactor. The carbon oxides are typically removed before use by means of pressure swing adsorption with molecular sieves for the final purification. The pressure swing adsorption works by adsorbing substantially all impurities from the syngas stream to leave a relatively pure hydrogen gas.

Steam methane reformers are widely used in industry to make hydrogen. Examples of steam methane gas reformers are disclosed in U.S. Pat. No. 6,759,016 to Sederquist, U.S. Pat. No. 7,037,485 to Drnevich et al., and U.S. Pat. No. 7,919,057 to Genkin et al., which are each incorporated by reference herein in their entirety.

For example, as shown and described in U.S. Pat. No. 6,759,016 to Sederquist, a catalytic hydrocarbon fuel steam reformer converts a fuel stream, comprising, for example, desulfurized natural gas, light distillates, methanol, propane, naphtha, kerosene, and/or combinations thereof, and water vapor into a hydrogen-rich reformate stream. It includes a reformer vessel having a shell and a header. The interior walls (including the top and bottom) of the vessel have an insulating layer. Disposed within the vessel are a vaporizer, the shell containing a reforming section, and a burner. In operation, a pressurized mixture comprising fuel and water is fed from the vaporizer inlet and is injected into the vaporizer. The fuel/water mixture flows within the vaporizer and is heated by heat exchange with the burner exhaust stream exiting the reforming section to produce a process stream comprising vaporized fuel and steam. The reactant stream exiting the vaporizer is supplied via a vaporizer outlet to the reforming section. The reactant stream exiting the vaporizer outlet is supplied to a reactant plenum, where it is distributed via feed tubes to reformer tubes. Reformer tubes are disposed within burner tubes that are fixed to a burner tube plate.

Despite previously proposed reformer systems, there remains a need for an improved reformer tube assembly for steam reformers.

SUMMARY OF THE INVENTION

As noted above, hot gas is delivered into the individual reformer tube of a steam reformer. It has been discovered that the hot process gas swirls or otherwise flows within the reformer tubes due to a differential pressure profile within each tube. It has further been discovered that the swirling hot gases is a cause contributing to the overheating of the flanges and the welds of a reformer tube, which may be detrimental to the lifespan and/or the performance of the reformer tube and the steam reformer in which the reformer tube is mounted. Additionally, it has been discovered that overheating is beneficially controlled by either reducing or eliminating the flow of hot process gas in the vicinity of the plug of the reformer tube.

According to one exemplary embodiment of the invention, a steam reformer tube assembly comprises a reformer tube including a wall defining an interior space for receiving fluid delivered into the reformer tube; a plug at least partially positioned in an opening in the interior space of the reformer tube such that a gap is defined between an exterior surface of the plug and the wall of the reformer tube; and a sealing member positioned in the gap to either limit or prevent the passage of fluid toward the opening in the interior space of the reformer tube and along the gap that is defined between the exterior surface of the plug and the wall of the reformer tube.

According to another exemplary embodiment of the invention, a plug for a steam reformer tube comprises a body portion that is sized to be positioned within an interior space of the steam reformer tube and to define a gap between an exterior surface of the body portion and a wall of the steam reformer tube; and a sealing member that is positioned against the exterior surface of the body portion that is sized to be positioned in the gap defined between the exterior surface of the body portion and the wall of the steam reformer tube to either limit or prevent the passage of fluid along the gap.

According to yet another exemplary embodiment of the invention, a method of assembling and which may include retrofitting a steam reformer tube assembly comprises the steps of positioning a sealing member adjacent an exterior surface of a plug; and inserting the plug and sealing member into an opening of a reformer tube such that the sealing member resides in a gap that is defined between the exterior surface of the plug and an interior wall of the reformer tube to either limit or prevent the passage of fluid along the gap.

BRIEF DESCRIPTION OF THE DRAWINGS

The invention is best understood from the following detailed description when read in connection with the accompanying drawings. The various features of the drawings are not to scale, and are expanded or reduced for clarity. Included in the drawings are the following figures.

DETAILED DESCRIPTION OF THE INVENTION

Figure 1:
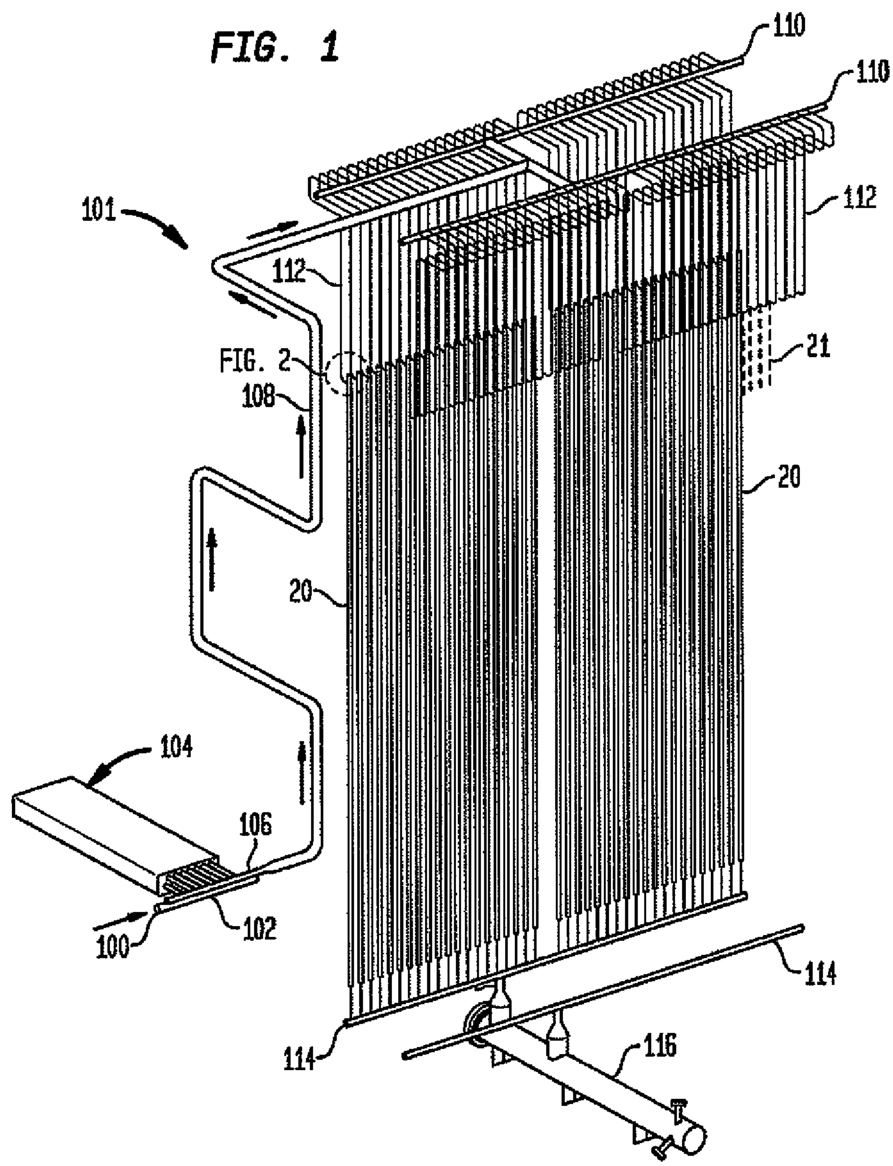
FIG. 1 depicts an embodiment of the process gas piping of a steam reformer.

Although the invention is illustrated and described herein with reference to specific embodiments, the invention is not intended to be limited to the details shown. Various modifications may be made to the illustrated embodiments within the scope and range of equivalents of the claims and without departing from the invention. Also, the embodiments selected for illustration in the figures are not shown to scale and are not limited to the proportions shown.

Referring generally to the Figures, a steam reformer tube assembly shown generally at 20 includes a reformer tube 1 having an interior wall defining an interior space for receiving fluid delivered into the reformer tube 1; a plug 27 at least partially positioned in an opening (such as the opening 12 in FIG. 4C) in the interior space of the reformer tube 1 such that a gap 31 is defined between an exterior surface of the plug 27 and the interior wall of the reformer tube 1; and a sealing member 30 positioned in the gap 31 to either limit or prevent the passage of fluid toward the opening 12 in the interior space of the reformer tube 1 and along the gap 31 that is defined between the exterior surface of the plug 27 and the interior wall of the reformer tube 1.

According to another aspect of the invention, the plug 27 for the steam reformer tube 1 comprises a body portion 28 that is sized to be positioned within the interior space of the steam reformer tube 1 and to define the gap 31 between the exterior surface of the body portion 28 and the interior wall of the steam reformer tube 1; and the sealing member 30 that is positioned against the exterior surface of the body portion 28 that is sized to be positioned in the gap 31 defined between the exterior surface of the body portion 28 and the interior wall of the steam reformer tube 1 to either limit or prevent the passage of fluid along the gap 31.

According to yet another aspect of the invention, a method of either assembling or retrofitting a steam reformer tube assembly 20 comprises the steps of positioning the sealing member 30 adjacent the exterior surface of the plug 27; and inserting the plug 27 and the sealing member 30 into an opening 12 of the reformer tube 1 such that the sealing member 30 resides in the gap 31 that is defined between the exterior surface of the plug 27 and the interior wall of the reformer tube 1 to either limit or prevent the passage of fluid along the gap 31.

Figure 2:
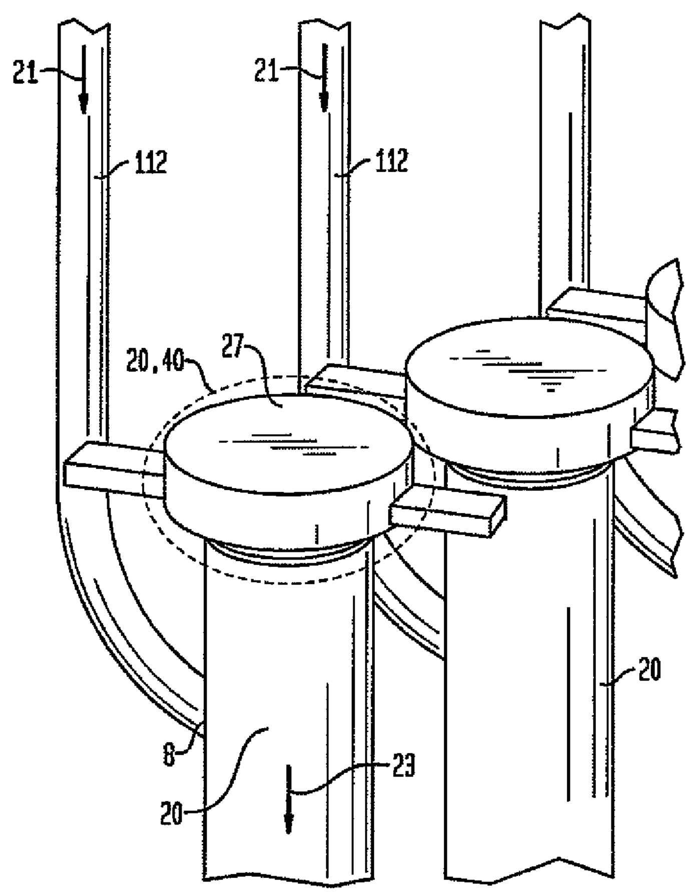
FIG. 2 depicts a detailed view of a portion of the process gas piping of the steam reformer of FIG. 1.

Referring now to FIGS. 1 and 2, FIG. 1 depicts an overall view of the process piping system of a steam reformer 101, and FIG. 2 depicts a detailed view of the process piping system of a steam reformer 101 shown in FIG. 1. In operation, process gas at a pre-determined temperature and pressure is delivered via piping (not shown) to the process gas inlet port 100 of a mixed feed preheat inlet header 102 (arrow denotes the flow direction) of the steam reformer 101. The gas is distributed through the header 102 and into a mixed feed preheat coil 104, as designated by the flow arrows, where it heated by flue gas within a convection section of the steam reformer 101.

The gas is then distributed from the preheat coil 104 into the mixed feed outlet header 106 and then into the crossover piping 108, as designated by the flow arrows. The gas stream is then distributed into a plurality, such as for example, two inlet headers 110. The gas is then distributed from the inlet headers 110 into a plurality of inlet piping 112 (also know as inlet pigtails) that are connected to a respective inlet header 110. The gas travels downwards, as depicted by flow arrows 21, through the inlet piping 112. The end of each inlet pipe 112 is connected to an inlet port 8 of a reformer tube assembly 20.

As shown in FIG. 2, the gas is then delivered from each inlet pipe 112 into a respective inlet port 8 of a catalyst-filled reformer tube assembly 20. As will be described in greater detail with reference to FIGS. 4A-4D, a plug 27 is mounted to the top end of each reformer tube assembly 20 to prevent the inadvertent escape of gases from the tube assembly 20. The gas flows downward thru each reformer tube assembly 20 where it is heated further by the flue gas within the radiant section of the reformer 101 and reformed into hydrogen, carbon dioxide and other molecules.

The reformed gas is distributed as indicated by arrows 23 from the individual reformer tube assemblies 20 into two outlet headers 114. The reformed gas then travels from the outlet headers 114 into a collecting manifold 116 that is fluidly coupled to the outlet headers 114. One portion of the tube assembly 20 in FIG. 1 has been removed from said Figure as indicated by broken lines 21 for purposes of clarity. The reformed gas then flows through the collecting manifold 116 into a process gas cooler (not shown) that is directly connected to the collecting manifold 116. The process gas cooler may be a shell and tube heat exchanger that reduces the temperature of the reformed gas to a predetermined value. The reformed gas is ultimately expelled from the outlet port of the process gas cooler.

Figure 3A:
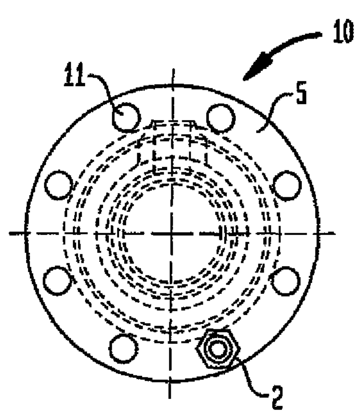
FIGS. 3A-3C depict top plan, perspective cut-away, and cross-sectional side views, respectively, of a conventional steam reformer tube assembly.
Figure 3B:
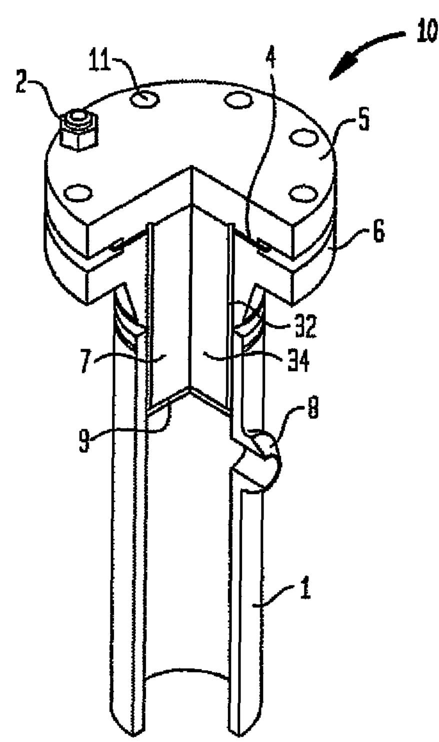
Figure 3C:
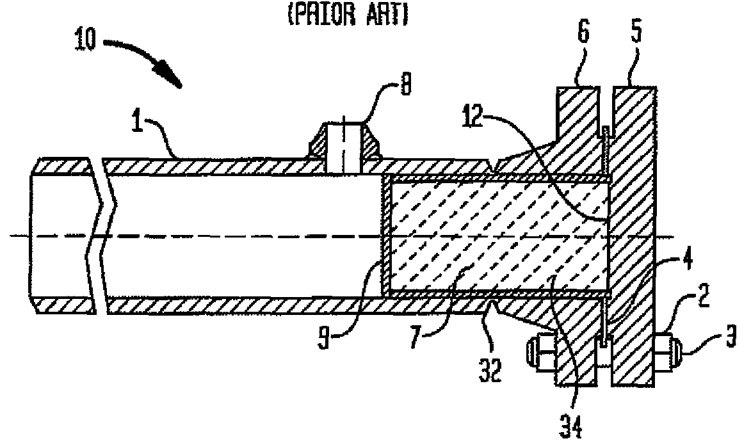

Referring now to FIGS. 3A-3C, there is depicted a top plan view, a perspective cut-away view and a cross-sectional side view, respectively, of a conventional steam reformer tube assembly 10 or apparatus. The tube assembly 10 may be utilized in a steam reformer 101. The components of the tube assembly 10 have a cylindrical shape. Hidden features of the tube assembly 10 are shown in broken lines in FIG. 3A.

The steam reformer tube assembly 10 generally includes a reformer tube 1, a plug 7 that is mounted at least partially within the proximal end of the reformer tube 1, and a gasket assembly 4 that is mounted between the blind flange 5 and flange 6 of the plug 7 and the reformer tube 1, respectively.

The reformer tube 1 includes a wall defining an interior space for containing fluid, such as hot gasses, delivered into the reformer tube 1 through an inlet port 8 provided at the wall of the reformer tube 1. The inlet port 8 is embodied as a weldolet for mounting a fluid delivery conduit thereto. The inlet port 8 is positioned in close proximity to the distal end of the plug 7. The inlet port 8 is positioned about three inches away from the distal end of the plug 7.

The tube 1 may be constructed of steel, for example. The outer diameter of the tube 1 may be about 5.5 inches (approximately 13.9 cm), for example, and the inner diameter of the tube 1 may be about 4.5 inches (approximately 11.4 cm), for example.

The plug 7 is at least partially positioned in an opening 12 in the interior space of the reformer tube 1 such that an annular gap (not explicitly shown) is defined between an exterior surface of the plug 7 and an interior surface of the wall of the reformer tube 1.

Referring now to the components of the plug 7, the plug 7 comprises the blind flange 5 that is welded to a hollow cylinder 32. An insulative member 34, which is optionally composed of a ceramic fiber material, is positioned within the interior of the hollow cylinder 32 of the plug 7. An end cap 9 of the plug 7 is mounted, such as by welding, to the end of the cylinder 32, as shown. Alternatively, the end cap 9 may be integrally formed with the cylinder 32.

The blind flange 5 of the plug 7 is mounted to the flange 6 of the reformer tube 1. A gasket assembly 4 is positioned between the flanges 5 and 6 to prevent the passage of fluid at the interface of the flanges 5 and 6. The blind flange 5 of the plug 7 includes a plurality of holes 11. The flange 6 of the reformer tube 1 includes a plurality of holes (not shown) that can be aligned for registration with the holes 11 of the blind flange 5 of the plug 7. A mechanical fastener 3 (one shown) is positioned through each one of the holes of the flanges 5 and 6 in registration to mount the blind flange 5 of the plug 7 to the flange 6 of the reformer tube 1. A threaded nut 2 (two shown) is mounted to each threaded end of each fastener 3 to bias the blind flange 5 and flange 6 together, thereby compressing the gasket assembly 4 that is positioned between those flanges 5 and 6.

In operation, hot gas is delivered through the inlet port 8 into the interior space of the reformer tube assembly 10. It has been discovered that the hot process gas swirls within the reformer tube assembly 10 and that this swirling or flow is caused by a differential pressure profile within the tube. Specifically, hot process gas flows from higher to lower pressure regions. Even when there is no flow, for example, a pressure differential within the reformer tube tends to promote gas movement. Thus, it is believed that hot process gas will flow toward the flanges 5 and 6 of the reformer tube 1 and the plug 7 as a result of pressure differentials in the assembly 10.

The hot process gas contacts the gasket assembly 4 and the flanges 5 and 6 because of the gap between the exterior of the plug 7 and the interior of the reformer tube 1 to disturb the flow of hot gases toward the flanges 5 and 6. It has been discovered that the swirling hot gases can overheat the flanges 5 and 6 of the reformer tube assembly 10, which may be detrimental to the lifespan and/or the performance of the reformer tube and the steam reformer in which the tube is mounted. Also, directing the hot gases away from the flanges 5 and 6 increases the thermal efficiency of the reformer, which can result in, for example, a 0.5 to 1.0 percent fuel savings. The gas is ultimately expelled from the tube 1 through a manifold (not shown).

Referring now to an exemplary embodiment of the invention shown in FIGS. 4A-4D, FIGS. 4A-4D depict top plan, perspective cut-away, cross-sectional side, and detailed cross-sectional views, respectively, of a steam reformer tube assembly 20 or apparatus including a sealing member 30. The tube assembly 20 is utilized in the steam reformer 101 of FIGS. 1 and 2, and replaces the conventional tube assembly 10 of FIGS. 3A-3C.

A plug 27 of the tube assembly 20 includes a blind flange 5 and a cylindrically-shaped body 28 that is positioned in an opening 12 of the interior space of the steam reformer tube 1. The body portion 28 includes a hollow cylinder 32 welded at one end to the blind flange 5, an insulative member 34 (optionally composed of a ceramic fiber material) positioned within an interior of the hollow cylinder 32, and an end-cap 29 welded to an opposed or free end of the cylinder 32. The blind flange 5 and the end cap 29 encase the insulative member 34.

The tube assembly 20 includes a unique sealing arrangement that can be used to limit and/or prevent fluid introduced into the reformer tube 1 from traveling within the gap 31 (see FIG. 4D) toward the flanges 5 and 6. More particularly, as shown in FIG. 4D, at least a portion of the sealing member 30 is positioned within the gap 31 that is defined between the inner surface of the tube 1 and the outer surface of the plug 27.

The sealing member 30 is positioned at least partially within a groove 35 that is formed along the circumference of the end cap 29. According to this exemplary embodiment, the sealing member 30 is provided as a length of sealing material that is preferably disposed along the groove 35, such as for example by wrapping, at least two times. The plurality of convolutions of the sealing member 30 are shown in FIG. 4D.

In an assembled form of the tube assembly 20 (as shown), the sealing member 30 is radially compressed against the inner surface of the tube 1 by approximately 0.03 inches (approximately 0.76 mm). A rounded edge, for example, or exterior surface of the sealing member 30 establishes contact along the entire circumference of the inner surface of the tube 1 to create a substantially fluid-tight, radial seal between the tube 1 and the plug body portion 28 of the plug 27, thereby substantially or completely preventing the passage of fluid into the gap 31.

According to this embodiment, the sealing member 30 is optionally composed of flexible, thermally conductive and resilient graphite material, such as that sold and distributed by the American Seal and Packing Corporation of Santa Ana, Calif., USA. The sealing member 30 may also be composed of a braided flexible graphite material, such as FLEXI-BRAID 5000 braided flexible graphite provided by Palmetto Inc., a Greene Tweed Company of Denton, Md.

The sealing member 30 may optionally be configured to provide a pressure boundary between the plug 27 and the inner surface of the tube 1. According to an alternative embodiment, however, the sealing member 30 may be configured to inhibit or restrictively control flow between the plug 27 and the inner surface of the tube 1, thus permitting some gas flow to pass the sealing member 30. Specifically, a small amount of the gas flow (between 1% and 5%, for example) optionally permeates through or past the sealing member 30, such that the gas pressure on both sides of the sealing member 30 can be substantially equal. Thus, the sealing member 30 is not required to function as a pressure boundary, unlike a seal configured to provide a pressure seal, according to this alternative embodiment. This is possible at least in part because a gasket assembly (such as gasket assembly 4) provides a pressure seal between the flanges 5 and 6 to prevent the escape of gas from the tube 1.

The sealing member 30 and the sealing arrangement may vary from that shown and described herein. For example, as shown in FIG. 4E a sealing member 131 may be positioned in a groove 132 disposed at the inner surface of the tube 1, and positioned in contact with the outer surface of the plug 27 to accomplish the same sealing function. The size, shape and material of the sealing member 30,131 may vary from that shown and described herein.

Upon introducing fluid through the inlet port 8 into the interior space of the tube assembly 20, the fluid is prevented from traveling past the sealing member 30 toward the flanges 5 and 6. The fluid is forced to travel toward the manifold (not shown) located at the distal end of the tube 1. Thus, the fluid does not heat the flanges 5 and 6 and other welds of the tube assembly 20. Although the sealing member 30 may create a complete seal preventing fluid, such as hot process gas, from traversing the sealing member 30, the sealing member 30 may also be configured to inhibit fluid flow, yet allow some fluid to traverse the sealing member 30. It is preferred, however, that the sealing member 30 is configured to significantly reduce or eliminate the swirling of fluid that has been discovered to transfer added heat toward the flange area of the plug.

Also, the sealing member 30 is preferably selected to permit sliding movement of the plug 27 into and out from the tube 1 and to center the plug 27 within the tube 1. Specifically, the dimensions of the sealing member 30 and the surfaces of the plug 27 are selected to allow sliding movement of the sealing member 30 with respect to the plug 27 and/or the inner wall of the tube 1 such that the plug 27 remains substantially centered in the tube 1 along the tube's axis, keeping the thickness of the annular gap 31 substantially equal along the circumference of the gap 31. Also, the material of the sealing member 30 is selected to facilitate such sliding movement. Thus, the sealing member 30 is an embodiment of a means for inhibiting gas flow, facilitating sliding movement of the plug with respect to the tube for removal and replacement, for centering the plug in the tube, and optionally for permitting some gas flow between the plug and the tube.

Other exemplary embodiments of the invention are shown in FIGS. 5A-5D of a steam reformer tube assembly 40 including a plug 47 having a slanted end 49. The tube assembly 40 is substantially similar to the tube assembly 20 of FIGS. 4A-4E, except that the differences between the tube assemblies 20 and 40 are described hereinafter.

An opposed or free end 49 of the plug 47 is slanted or has an angled surface at a grade to direct fluid flow depicted by arrows 60 introduced through the fluid port 8 into the interior space away from the flanges 5 and 6 and toward a manifold (not shown).

An angle defined between a plane that passes through the slanted surface of the end 49 and the longitudinal axis of the inlet port 8 may be about 45 degrees by way of example only, but other larger and smaller angles are contemplated as well. A point located at a center of the slanted surface intersects the longitudinal axis of the port 8.

Figure 4A:
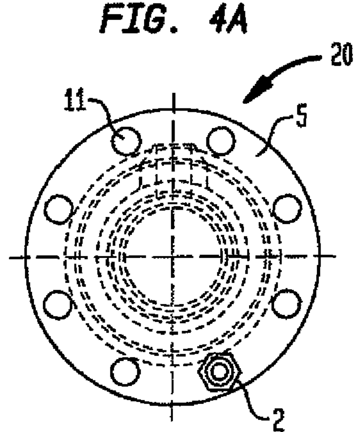
FIGS. 4A-4E depict top plan, perspective cut-away, cross-sectional side, detailed cross-sectional and another detailed cross-sectional side views, respectively, of a steam reformer tube assembly including a sealing member, according to an exemplary embodiment of the invention.
Figure 4B:
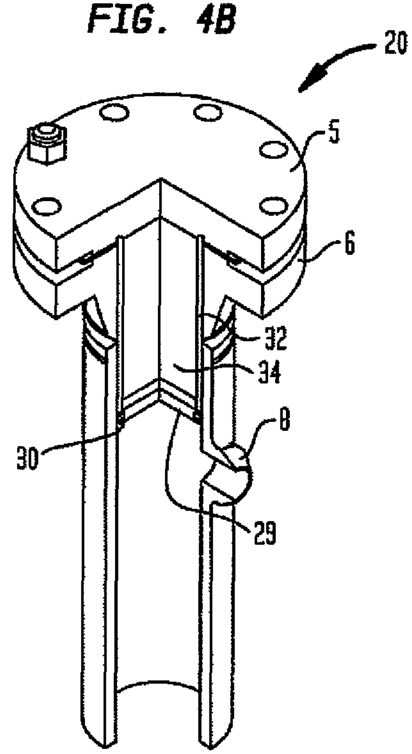
Figure 4C:
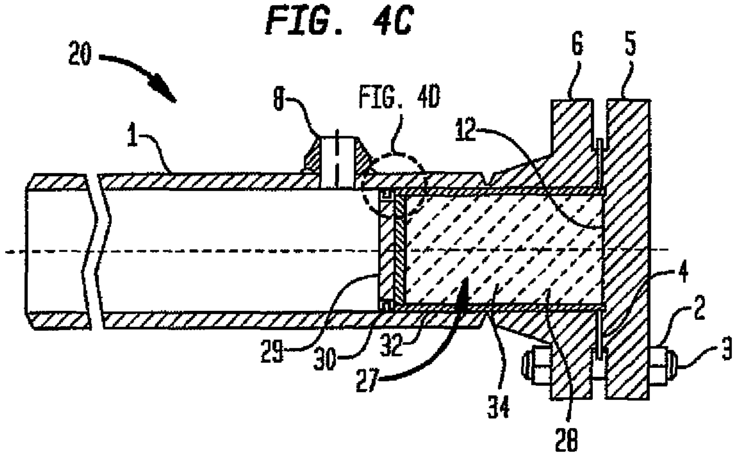
Figure 4D:
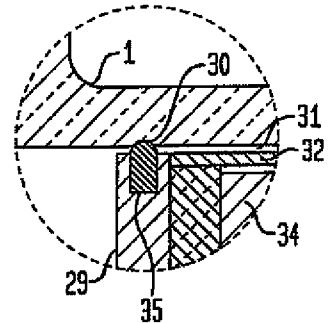
Figure 4E:
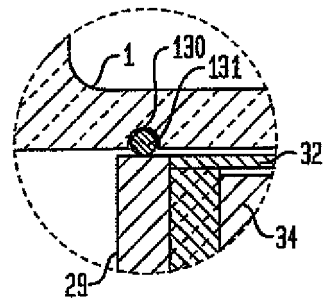
Figure 5A:
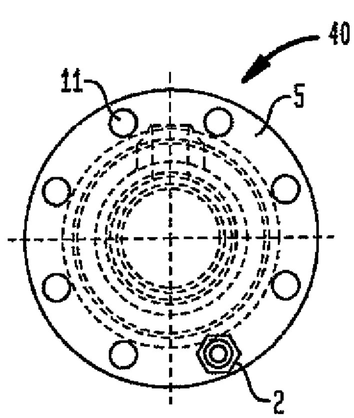
FIGS. 5A-5D depict top plan, perspective cut-away, cross-sectional side and another cross-sectional side views, respectively, of a steam reformer tube assembly including a plug defining a slanted end, according to another exemplary embodiment of the invention.
Figure 5B:
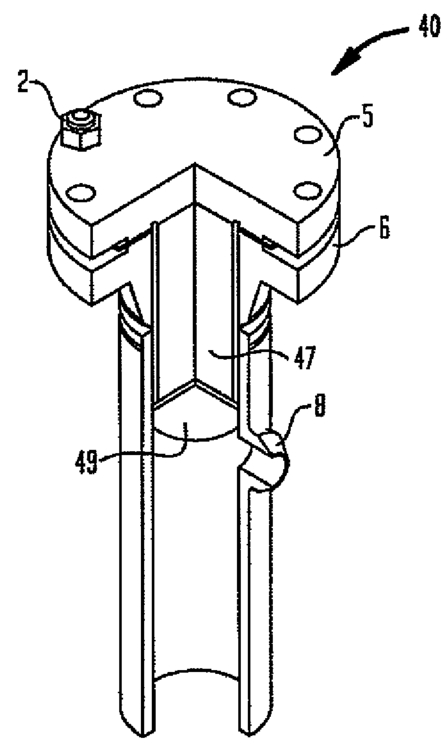
Figure 5C:
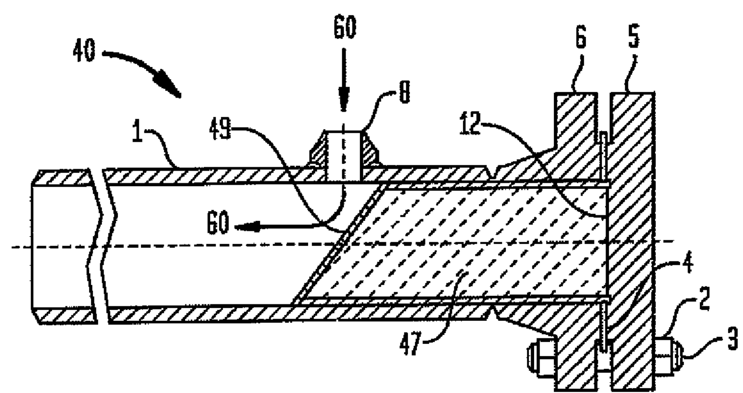
Figure 5D:
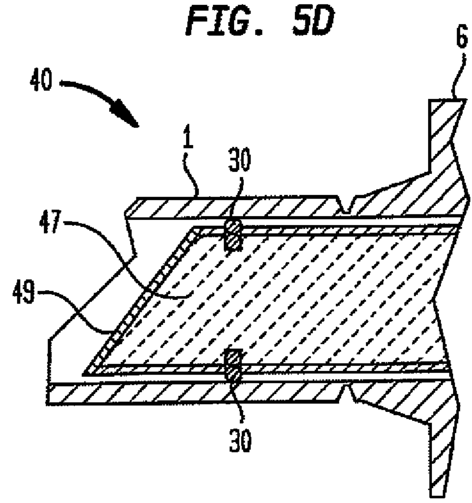

As shown in FIG. 5D, a sealing member 30,131 similar in construction to that shown with respect to either of FIGS. 4D and 4E may be positioned around an exterior surface of the plug 47 to completely or at least partially prevent the fluid 60 from traveling toward the flanges 5 and 6.

While various embodiments of the invention have been shown and described herein, it will be understood that such embodiments are provided by way of example only. Numerous variations, modifications and substitutions will occur to those skilled in the art without departing from the spirit and scope of the invention. Accordingly, it is intended that the appended claims cover all such variations as fall within the spirit and scope of the invention.

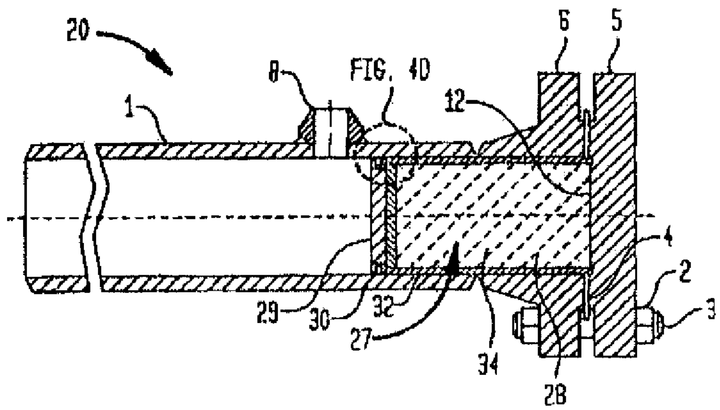

What is claimed is:

1. A steam reformer tube assembly, comprising:

a reformer tube including a wail defining an interior space and an inlet port through fluid is delivered into the reformer tube;

a plug having an angled end and being at least partially positioned in an opening in the interior space of the reformer tube such that a gap is defined between an exterior surface of the plug and the interior wall of the reformer tube; and a sealing member positioned in the gap to either limit or prevent the passage of the fluid toward the opening in the interior space of the reformer tube and along the gap;

wherein the inlet port is positioned in close proximity to the plug. and an end of the plug positioned adjacent the inlet port is angled to direct the fluid introduced through said inlet port away from the sealing member.

2. The steam reformer tube assembly of claim 1, wherein a blind flange of the plug is mounted to a flange of the reformer tube.

3. The steam reformer tube assembly of claim 2, further comprising a gasket mounted between the blind flange of the plug and the flange of the reformer tube, wherein the gasket is positioned in fluid communication with the gap.

4. The steam reformer tube assembly of claim 1, wherein the plug further comprises a recess formed at the exterior surface of the plug, and the sealing member is positioned In the recess and sized and shaped to contact the interior wall of the reformer tube.

5. The steam reformer tube assembly of claim 1, wherein the sealing member is selected from the group consisting of an o-ring and flexible packing.

6. The steam reformer tube assembly of claim 5, wherein the flexible packing comprises braided graphite.

7. The steam reformer tube assembly of claim 1, wherein the reformer tube further comprises a recess formed at the interior wall of the reformer tube, and the sealing member is positioned in the recess and sized and shaped to contact the exterior surface of the plug.

8. A plug for a steam reformer tube with an net port, comprising:

a body portion that is sized to be positioned within an interior space of the steam reformer tube and to define a gap between an exterior surface of the body portion and an interior wall of the steam reformer tube, the body portion comprising an angled end; and a sealing member positioned against the exterior surface of the body portion, the sealing member sized to be positioned in the gap to either limit or prevent the passage of fluid along the gap;

wherein the fluid introduced through the inlet port is directed by the angled end away from the sealing member.

9. The plug of claim 8, further comprising a blind flange that extends from the body portion, said blind flange configured to be mounted to a flange of the reformer tube.

10. The plug of claim 8, wherein the body portion further comprises a recess formed at the exterior surface of the body portion, and the sealing member is positioned in the recess and sized to contact the interior wall of the steam reformer tube.

11. The plug of claim 8, wherein the sealing member is selected from the group consisting of an o-ring and flexible packing.

12. The plug of claim 11, wherein the flexible packing comprises braided graphite.

13. A method of assembling a steam reformer tube having inlet port. comprising:

positioning a sealing member adjacent an exterior surface of a plug having a slanted end; and inserting the plug having the sealing member into an opening of a steam reformer tube such that the sealing member resides in a gap that is defined between the exterior surface of the plug and an interior wall of the steam reformer tube to either limit or prevent the passage of fluid along the gap, said inserting, further comprising:

positioning the slanted end of the plug in close proximity to the inlet port for directing the fluid introduced through the inlet port away from the sealing member.

14. The method of claim 13, wherein the positioning a sealing member further comprises positioning the sealing member in a recess formed at the exterior surface of the plug.

15. The method of claim 13, wherein prior to the inserting the plug, the method further comprises positioning a gasket between a flange of the plug and a flange of the steam reformer tube to either limit or prevent the passage of the fluid between the flanges once the flanges are mounted together.

* * * * *

UNITED STATES PATENT AND TRADEMARK OFFICE

CERTIFICATE OF CORRECTION

PATENT NO. : 8,776,344 B2
APPLICATION NO. : 13/587192
DATED : July 15, 2014
INVENTOR(S) : John R. Garland and Paul van Helmond It is certified that error appears in the above-identified patent and that said Letters Patent is hereby corrected as shown below:

On the Title Page:

The Title Page should be replaced with the attached Title Page.

Fig. 4C below should be used to accompany the Abstract, not Fig. 2.

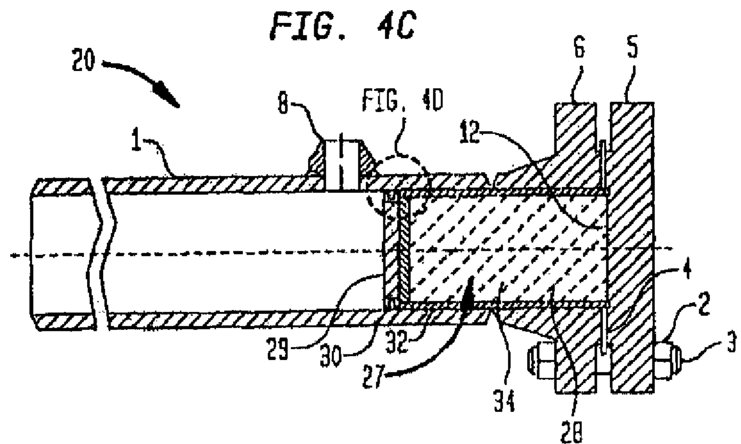

In the Claims:

Column 7, line 33 delete “wail” and insert therefor --wall--; line 34 between “through” and “fluid” insert --which--; line 45 delete “.”.

Column 7, line 57 delete “In” and insert therefor --in--.

Column 8, line 11 delete “net” and insert therefor --inlet--.

Column 8, line 39 delete “.”; line 47 delete “,”.

Signed and Sealed this
Seventh Day of October, 2014

Michelle K. Lee
*Deputy Director of the United States Patent and Trademark Office*

(12) United States Patent
Garland et al.

(10) Patent No.: US 8,776,344 B2
(45) Date of Patent: Jul. 15, 2014

(54) STEAM REFORMER TUBE ASSEMBLY AND METHOD OF ASSEMBLING OR RETROFITTING SAME

(75) Inventors: John R. Garland, Hatfield, PA (US); Paul van Helmond, Pottstown, PA (US)

(73) Assignee: Selas Fluid Processing Corporation, Blue Bell, PA (US)

( * ) Notice: Subject to any disclaimer, the term of this patent is extended or adjusted under 35 U.S.C. 154(b) by 183 days.

(21) Appl. No.: 13/587,192

(22) Filed: Aug. 16, 2012

(65) Prior Publication Data

US 2013/0209318 A1 Aug. 15, 2013

Related U.S. Application Data

(60) Provisional application No. 61/579,106, filed on Dec. 22, 2011.

(51) Int. Cl.
*B01J 8/06* (2006.01)
*B21D 39/03* (2006.01)

(52) U.S. Cl.
CPC .......... *B01J 8/06* (2013.01); *B01J 2208/00504* (2013.01); *B01J 8/062* (2013.01); *B01J 2208/0053* (2013.01)
USPC ............ 29/428; 422/162; 422/198; 422/310; 422/312; 138/89

(58) Field of Classification Search
CPC .................................. B01J 8/06; B21D 39/03
USPC ........ 422/162, 310, 312, 198; 29/428; 138/89
See application file for complete search history.

(56) References Cited

U.S. PATENT DOCUMENTS

| | | | | |
|---|---|---|---|---|
| 3,653,196 | A * | 4/1972 | Pike | 57/350 |
| 4,497,418 | A * | 2/1985 | Nunlist | 220/234 |
| 4,646,816 | A * | 3/1987 | Rothstein | 165/76 |
| 5,228,701 | A * | 7/1993 | Greinke et al. | 277/539 |
| 5,370,252 | A * | 12/1994 | Parsons et al. | 215/247 |
| 5,944,057 | A * | 8/1999 | Pierce | 138/89 |
| 6,759,016 | B2 | 7/2004 | Sederquist et al. | |
| 7,037,485 | B1 | 5/2006 | Drnevich et al. | |
| 7,919,057 | B2 | 4/2011 | Genkin et al. | |
| 2005/0235963 | A1* | 10/2005 | Kilgore | 123/456 |

* cited by examiner

*Primary Examiner* — Walter D Griffin
*Assistant Examiner* — Huy-Tram Nguyen
(74) *Attorney, Agent, or Firm* — Joshua L. Cohen

(57) ABSTRACT

A steam reformer tube assembly includes a reformer tube including a wall defining an interior space for receiving fluid delivered into the reformer tube, a plug at least partially positioned in an opening in the interior space such that a gap is defined between the plug and the wall of the reformer tube, and a sealing member positioned in the gap to either limit or prevent the passage of fluid toward the opening in the interior space of the reformer tube and along the gap that is defined between the exterior surface of the plug and the interior wall of the reformer tube. A method of assembling a steam reformer tube assembly is also provided.

15 Claims, 6 Drawing Sheets